(12) United States Patent
Ozcan et al.

(10) Patent No.: US 9,670,598 B2
(45) Date of Patent: Jun. 6, 2017

(54) METHOD OF MANUFACTURING TIN-DOPED INDIUM OXIDE NANOFIBERS

(71) Applicant: UT-Battelle, LLC, Oak Ridge, TN (US)

(72) Inventors: Soydan Ozcan, Oak Ridge, TN (US); Amit K Naskar, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 185 days.

(21) Appl. No.: 14/673,130

(22) Filed: Mar. 30, 2015

(65) Prior Publication Data

US 2016/0289867 A1 Oct. 6, 2016

(51) Int. Cl.

| | | |
|---|---|---|
| C01G 15/00 | (2006.01) | |
| C01G 19/02 | (2006.01) | |
| D01D 5/04 | (2006.01) | |
| D01D 5/06 | (2006.01) | |
| D01D 5/08 | (2006.01) | |
| D01D 5/28 | (2006.01) | |
| D01D 5/30 | (2006.01) | |
| D01D 5/32 | (2006.01) | |
| D01D 10/02 | (2006.01) | |
| D01F 9/08 | (2006.01) | |
| C01G 19/00 | (2006.01) | |

(Continued)

(52) U.S. Cl.
CPC ............... *D01F 9/08* (2013.01); *C01G 19/00* (2013.01); *D01D 5/34* (2013.01); *D01D 5/36* (2013.01); *C01P 2004/16* (2013.01); *C01P 2004/90* (2013.01)

(58) Field of Classification Search
CPC .......... C01G 15/00; C01G 19/02; D01D 5/04; D01D 5/06; D01D 5/08; D01D 5/28; D01D 5/30; D01D 5/32; D01D 5/34; D01D 5/36; D01D 10/02; D01F 8/18; D01F 9/08
USPC ..... 264/82, 83, 103, 172.11, 172.12, 172.13, 264/172.14, 172.15, 172.16, 172.17, 264/172.18, 210.8, 211.14, 211.15, 264/211.16, 211.17

See application file for complete search history.

(56) References Cited

U.S. PATENT DOCUMENTS

| | | | | |
|---|---|---|---|---|
| 8,465,691 B1 * | 6/2013 | Zhou | ..................... | D01F 9/08 264/639 |
| 2007/0075462 A1 * | 4/2007 | Coughlin | ............... | C01G 19/00 264/465 |

(Continued)

FOREIGN PATENT DOCUMENTS

KR 100836627 B1 * 8/2008 ............... D01F 1/10

*Primary Examiner* — Leo B Tentoni
(74) *Attorney, Agent, or Firm* — Fox Rothschild LLP

(57) ABSTRACT

A method of making indium tin oxide nanofibers includes the step of mixing indium and tin precursor compounds with a binder polymer to form a nanofiber precursor composition. The nanofiber precursor composition is co-formed with a supporting polymer to form a composite nanofiber having a precursor composition nanofiber completely surrounded by the supporting polymer composition. The supporting polymer composition is removed from the composite nanofiber to expose the precursor composition nanofiber. The precursor composition nanofiber is then heated in the presence of oxygen such as $O_2$ to form indium tin oxide and to remove the binder polymer to form an indium tin oxide nanofiber. A method of making metal oxide nanofibers is also disclosed.

23 Claims, 2 Drawing Sheets

(51) Int. Cl.
*D01D 5/34* (2006.01)
*D01D 5/36* (2006.01)

(56) References Cited

U.S. PATENT DOCUMENTS

2011/0151255 A1* 6/2011 Kim .......................... D01F 9/08
264/211.12 X
2015/0099185 A1* 4/2015 Joo ........................... D01F 1/09
264/465 X

* cited by examiner

METHOD OF MANUFACTURING TIN-DOPED INDIUM OXIDE NANOFIBERS

STATEMENT REGARDING FEDERALLY SPONSORED RESEARCH

This invention was made with government support under contract No. DE-AC05-000R22725 awarded by the U.S. Department of Energy. The government has certain rights in this invention.

FIELD OF THE INVENTION

This invention pertains generally to methods of making metal oxide nanofibers, and more particularly to methods of making tin-doped indium oxide nanofibers.

BACKGROUND OF THE INVENTION

Tin-doped indium oxide (ITO) is an enabling material for a growing number of applications that require a highly-conductive and transparent surface, including solar cells, liquid-crystal, plasma and touchscreen displays, electromagnetic shielding, and other applications. Various deposition methods (both solution and vapor) and sputtering techniques have been commonly used to produce ITO films. Existing techniques are not scalable for large-volume fabrication or very cost intensive to scale. Lately, one-dimensional nano-structured materials such as nanowires, nanofibers, nanorods, and nanotubes have received attention for their potential applications in numerous areas due to their special properties, which are distinct from conventional bulk materials. For example, metallic nanowires and carbon-based nano-structures have been tried for transparent flexible electrodes, but the poor thermal stability of metal nanowires and the poor combinations of conductivity and transparency that are available from carbon-based nano-structures limits their application to displace ITO films.

$In_2O_3$ nanowires have been also demonstrated to work as gates in a field effect transistors and as ultra-sensitive chemical sensors for $NO_2$ and $NH_3$, exhibiting significantly improved chemical sensing performance compared to existing thin film-based sensors due to their enhanced surface to volume ratio. More recent research efforts have demonstrated the possibility to use ITO in its nanofiber form for sensing and transparent electrode applications. It has been shown that interwoven ITO fibers can produce a web to provide an advantageous alternative to an ITO-deposited glass surface. However, applications in this embodiment are not feasible on an industrial scale since the ability to produce such ITO nanofiber webs in large scale, at high yields/volume and at high production rates has not been demonstrated.

SUMMARY OF THE INVENTION

A method of making indium tin oxide nanofibers comprises the steps of: mixing indium and tin precursor compounds with a binder polymer to form a nanofiber precursor composition; co-forming the nanofiber precursor composition with a supporting polymer to form a composite nanofiber comprising a precursor composition nanofiber surrounded by the supporting polymer composition; removing the supporting polymer composition from the composite nanofiber to expose the precursor composition nanofiber; and heating the precursor composition nanofiber in the presence of oxygen such as $O_2$ to form indium tin oxide and to remove the binder polymer to form an indium tin oxide nanofiber.

The precursor composition nanofiber can be between 100 nm and 20 μm in width or diameter. The composite fiber can be greater than 10 μm in width or diameter. The indium tin oxide fiber can be less than 100 μm. The method can further comprise the step of stretching the nanofiber precursor to produce indium tin oxide fiber to a width of less than 1 μm.

The indium precursor compound can be at least one selected from the group consisting of Indium acetate (In($CH_3COO)_3$), Indium trihalide such as Indium trichloride ($InCl_3$) and Indium tribromide ($InBr_3$), Indium nitrate (In($NO_3)_3$), Indium sulfate ($In_2(SO_4)_3$), and Indium hydroxide (In($OH)_3$).

The tin precursor compound can be at least one selected from the group consisting of Tin (II) 2-ethylhexanoate ($[CH_3(CH_2)_3CH(C_2H_5)CO_2]2Sn$), Tin (II) halide such as Tin Chloride ($SnCl_2.2H_2O$) and Tin Bromide ($SnBr_2$), Tin Pyrophosphate ($Sn_2P_2O_7$), and Tin Nitrate ($Sn(NO_3)_4$).

The binder polymer can be at least one selected from the group consisting of polyethylene, polyethelene oxide, polyvinyl acetate, poly lactic acid, polyester, polypropylene, and ethylene-propylene copolymers. The supporting polymer can be at least one selected from the group consisting of polylactic acid, polyethelene, polyesters, polystyrene, and polyurethane.

The step of removing the supporting polymer composition can include heating. The heating to remove the supporting polymer composition can be to a temperature sufficient to melt, pyrolize, or combust the supporting polymer composition, but not the binder polymer.

The step of removing the supporting polymer composition comprises the step of contacting the supporting polymer with a removal composition. The removal composition can include at least one selected from the group consisting of a solvent for the supporting polymer, and a composition reactive with the supporting polymer and unreactive with the binder polymer.

The step of heating the precursor nanofiber to form indium tin oxide can include heating the precursor composition nanofiber to between 300° C. and 1000° C. The step of heating the precursor composition nanofiber to form indium tin oxide can include increasing the temperature of the precursor composition nanofiber at a ramp rate of between 1° C./min. and 20° C./min.

The co-forming step can include melt spinning. The co-extruding step can include multicomponent spinning. The multicomponent spinning can include at least one selected from the group consisting of melt spinning, gel spinning, and solution spinning. The co-forming step can include forming the precursor composition nanofiber into a desired shape.

The method can further include the step of forming a plurality of the indium tin oxide nanofibers into a web.

The mixing step can include at least one selected from the group consisting of melt mixing and solution mixing.

The method can include the step of, after the formation of indium tin oxide, treating the indium tin oxide nanofiber to render the indium tin oxide nanofiber more electrically conductive. The treating can be with heat and $H_2$.

A method of making metal oxide nanofibers can include the step of mixing metal oxide precursor compounds with a binder polymer to form a nanofiber precursor composition, and co-forming the nanofiber precursor composition with a supporting polymer to form a composite nanofiber comprising a precursor composition nanofiber surrounded by the supporting polymer composition. The supporting polymer composition is removed from the composite nanofiber to expose the precursor composition nanofiber. The precursor composition nanofiber is heated in the presence of oxygen such as $O_2$ to form metal oxide and to remove the binder polymer to form a metal oxide nanofiber.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
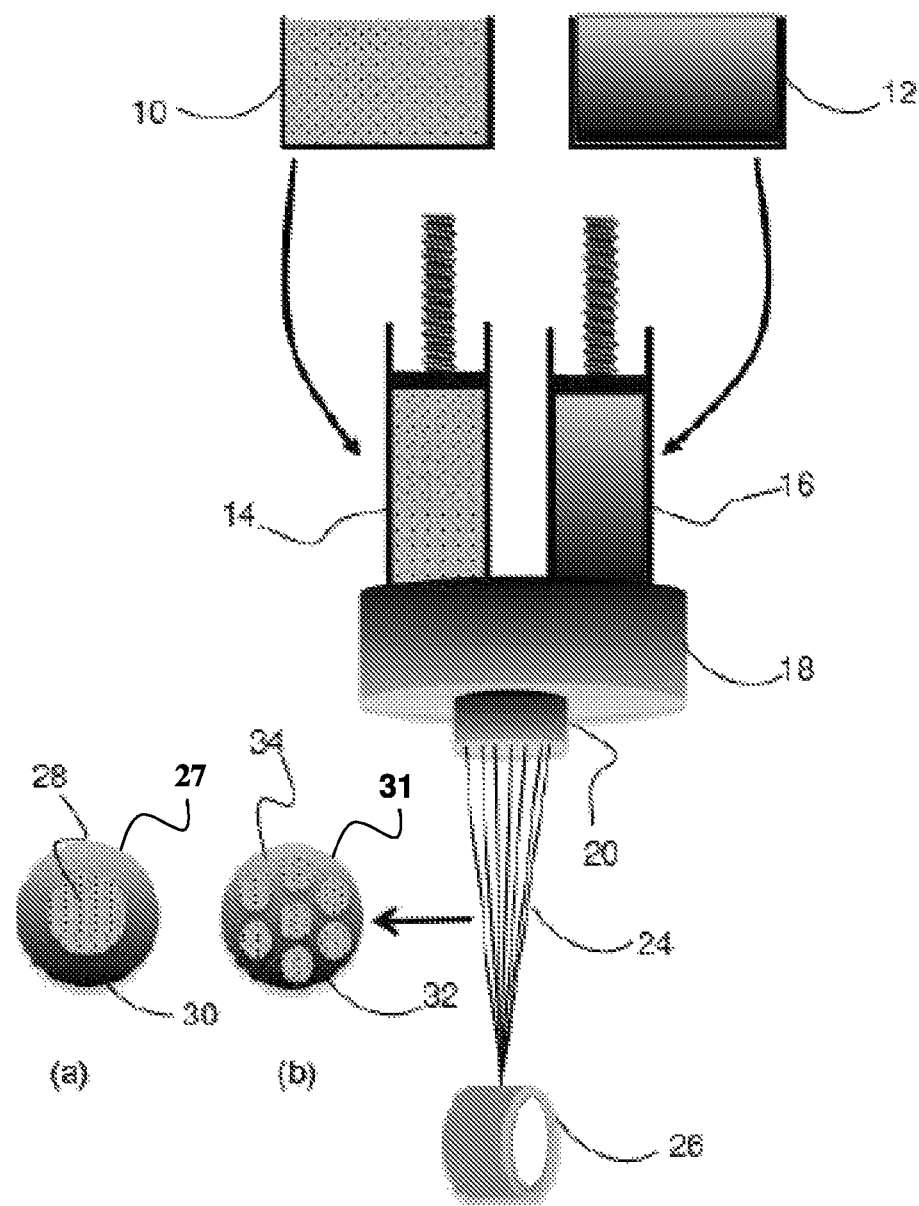
FIG. 1 is a schematic diagram of the method of making tin-doped indium tin oxide nanofibers according to the invention.

A method of making indium tin oxide nanofibers comprises the steps of: mixing indium and tin precursor compounds with a binder polymer to form a nanofiber precursor composition; co-forming the nanofiber precursor composition with a supporting polymer to form a composite nanofiber comprising a precursor composition nanofiber surrounded by the supporting polymer composition; removing the supporting polymer composition from the composite nanofiber to expose the precursor composition nanofiber; and heating the precursor composition nanofiber in the presence of oxygen such as $O_2$ to form indium tin oxide and to remove the binder polymer to form an indium tin oxide nanofiber. The supporting polymer can completely surround the precursor composition nanofiber to provide complete circumferential coverage and support of the precursor composition nanofiber.

The precursor composition nanofiber can be between 100 nm and 20 μm in width. The composite nanofiber can be greater than 10 μm in width. The indium tin oxide nanofiber can be less than 100 μm. The method can further comprise the step of stretching the nanofiber precursor to produce indium tin oxide nanofiber to a width of less than 1 μm.

The co-forming process can be extrusion, fiber spinning, melt-blowing, or any suitable process. The co-forming can be bicomponent including precursor fiber and supporting polymer to result composite fiber, and also can be multicomponent spinning which will have other components, for example third and fourth compositions in the precursor fiber or precursor fibers having different compositions in the same composite fiber Alternative shapes of precursor nanofiber can be formed. The precursor fibers can be one to hundreds or thousands of fibers in a single fiber composite fiber. The precursor fiber shape can be controlled to provide a desired shape such as circular, square, triangle star shape and so on.

The indium precursor compound can be at least one selected from the group consisting of Indium acetate (In $(CH_3COO)_3$, Indium trihalide such as Indium trichloride ($InCl_3$) and Indium tribromide ($InBr_3$), Indium nitrate (In $(NO_3)_3$), Indium sulfate ($In_2(SO_4)_3$), and Indium hydroxide ($In(OH)_3$).

The tin precursor compound can be at least one selected from the group consisting of Tin (II) 2-ethylhexanoate ($[CH_3(CH_2)3CH(C_2H_5)CO_2]2Sn$), Tin (II) Halide such as Tin Chloride ($SnCl_2.2H_2O$), Tin Bromide ($SnBr_2$), Tin Pyrophosphate $Sn_2P_2O_7$, and Tin Nitrate $Sn(NO_3)_4$.

The binder polymer can be at least one selected from the group consisting of polyethylene, polyethelene oxide, polyvinyl acetate, poly lactic acid, polyester, polypropylene, and ethylene-propylene copolymers. Other binder polymers are possible. The binder polymer must be non-reactive with the precursor compounds, must be capable of extrusion, spinning, or otherwise forming into the precursor nanofiber, and must be removable following co-forming by suitable means which does not degrade the resulting indium tin oxide nanofiber. The supporting polymer can be at least one selected from the group consisting of polylactic acid, polyethelene, polyesters, polystyrene, and polyurethane. Other supporting polymers are possible. The supporting polymer must be non-reactive with the precursor compounds and the binder polymer, must be capable of co-forming with the precursor nanofiber, and must be removable following co-forming by suitable means which does not degrade the precursor composition nanofiber or the resulting indium tin oxide nanofiber.

The step of removing the supporting polymer composition can include heating. The heating to remove the supporting polymer composition can be to a temperature sufficient to melt, pyrolize, or combust the supporting polymer composition, but not the binder polymer.

The step of removing the supporting polymer composition comprises the step of contacting the supporting polymer with a removal composition. The removal composition can include at least one selected from the group consisting of a solvent for the supporting polymer, and a composition reactive with the supporting polymer and unreactive with the binder polymer.

The step of heating the precursor nanofiber to form indium tin oxide can include heating the precursor composition nanofiber to between 300° C. and 1000° C. The step of heating the precursor composition nanofiber to form indium tin oxide can include increasing the temperature of the precursor composition nanofiber at a ramp rate of, for example, between 1° C./min. and 20° C./min, or by heating at a higher ramp rate or by subjecting the nanofiber to a step temperature change as by heating in an oven set at the desired temperature.

The co-forming step can include extrusion, melt spinning or solution spinning, melt-blowing, or other suitable processes. The co-forming step can include multicomponent spinning. The multicomponent spinning can include at least one selected from the group consisting of melt spinning, gel spinning, and solution spinning. The co-forming step can include forming the precursor composition nanofiber into a desired shape.

The method can further include the step of forming a plurality of the indium tin oxide nanofibers into a web.

The mixing step can include at least one selected from the group consisting of melt mixing and solution mixing.

The method can include the step of, after the formation of indium tin oxide, treating the indium tin oxide nanofiber to render the indium tin oxide nanofiber more electrically conductive. The treating is with heat and $H_2$. Other gases or processes to create an oxygen deficiency in the indium tin oxide nanofiber to render the nanofiber more electrically conductive are known and can be utilized.

A method of making metal oxide nanofibers can include the step of mixing metal oxide precursor compounds with a binder polymer to form a nanofiber precursor composition, and co-forming the nanofiber precursor composition with a supporting polymer to form a composite nanofiber comprising a precursor composition nanofiber completely surrounded by the supporting polymer composition. The supporting polymer composition is removed from the composite fiber to expose the precursor composition nanofiber. The precursor composition nanofiber is heated in the presence of $O_2$ to form metal oxide and to remove the binder polymer to form a metal oxide nanofiber. $Fe_2O_3$, MgO, $Cr_2O_3$, AlO, $TiO_2$, $Ag_2O$, $Co_3O_4$, $Ca_2Mn_2O_5$.

FIG. 1 is a schematic diagram of the method of making tin-doped indium tin oxide nanofibers according to the invention. The indium and tin precursor compounds can be mixed and provided with the binder polymer in container or source 10, and the supporting polymer can be provided in container or source 12. The indium and tin precursor and binder polymer mixture can be sent to co-extrusion or co-forming chamber 14 of co-extruder 18. The supporting polymer can be sent to co-extrusion chamber 16 of co-extruder 18. The indium and tin precursor and binder polymer mixture and supporting polymer can be co-extruded in a suitable co-extrusion head 20 to produce co-extrusion strands 24 which are collected on a suitable device such as spool 26. The co-extrusion can take a variety of shapes such as composite nanofiber 27 having a precursor composition nanofiber 28 surrounded and enclosed by a surrounding sheath 30 of supporting polymer as shown in FIG. 1(a). Alternatively a composite nanofiber 31 can include a plurality of precursor composition nanofibers 32 enclosed within and surrounded by supporting polymer 34 as shown in FIG. 1(b). The supporting polymer supports and protects the precursor composition nanofibers for the formation of the indium tin oxide nanofibers.

Figure 2:
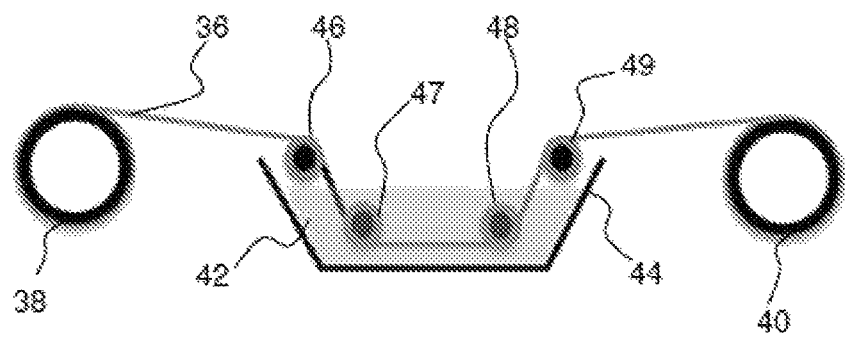
FIG. 2 is a schematic diagram of another step.

There is shown in FIG. 2 the removal of the supporting polymer composition. The strands 36 can be passed from a spool 38 to a take-up spool 40 and through a bath 42. The bath 42 comprises a compound that is suitable to remove the supporting polymer. The components of the bath will therefore be dependent on the chemical composition of the supporting polymer. A series of rollers 46-49 or suitable structure can be provided to assist in the transport of the strands through the bath. Other suitable means for removing the supporting polymer are possible and include heat and DMSO, DMF, chloroform.

Figure 3:
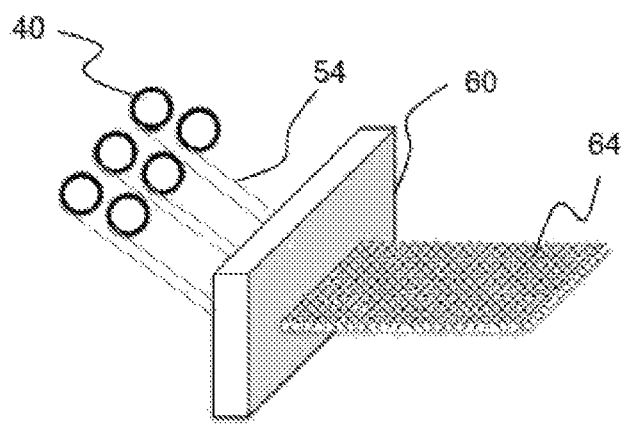
FIG. 3 is a schematic diagram of yet another step.
Figure 4:
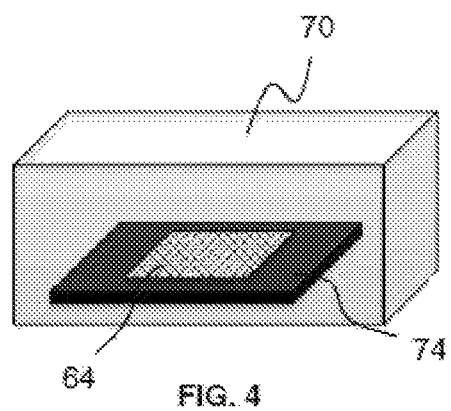
FIG. 4 is a schematic diagram of still another step.

There is shown in FIG. 3 the strands of precursor composition nanofibers 54 leaving spools 40 and passing through a web or weaving or knitting device 60 to form a web or weave 64 of the precursor composition nanofibers. In FIG. 4 the web 64 is placed into heating chamber 70 to convert the precursor composition nanofibers to indium tin oxide nanofibers. The web 64 can be positioned on a suitable support 74 in the heating chamber 70.

EXAMPLES

Example 1

Melt spinning: Indium tin oxide precursors were combined in a stoichiometric ratio of 9 to 1 indium to tin ratio in high density polyethylene polymer to create a compound suitable for melt spinning. The mixture was formed by Indium Acetate, Tin Octoate and high density polyethylene by mixing in a high shear mixer. The high shear mixer was maintained at 195 C and ramped to 30 rpm until torque stabilizes and ramped to 60 rpm until the torque stabilizes again. The total mixing time was 5 minutes. A lab scale bi-component spinner was utilized to alter the diameter of the ITO loaded polymer. The percentage of PEO is varied from 30% to 60% in mixture and all cases it was successfully spun using the multicomponent spinning.

By using polylactic acid (PLA) as the sacrificial component, the loaded polymer was able to be manipulated by precursor nanofibers arranged in a geometrical arrangement into composite fibers. The spinning head temperature was set to 200 C. The PLA component can be removed in a tetrahydrofuran (THF) bath at a temperature of 80 C and then stretched to obtain small diameter fibers. PLA can also be removed by alkaline hot water washing. Another example, polyvinyl butyral (PVB) can be dissolved easily with organic solvents such as anhydrous methanol or ethanol. Polyvinyl alcohol (PVA) can be dissolved in water. Melt extrudable lignin can also be used as sacrificial component. Lignin can be dissolved in aqueous alkali, dimethyl formamide, dimethyl sulfoxide quickly.

The precursor fiber was calcined at 500 C to form the ITO fiber web. A network of indium tin oxide micro-wires were then collected post calcination, with a diameter of approximately less than 5 µm. In order to improve the electrical conductivity the ITO fibers were exposed to heat treatment under $H_2$/Ar mix (4% $H_2$ level) at 350 C.

Example 2

Another set of precursor fibers were prepared using nanoparticles of ITO added to PVAc for subsequent bio-component melt spinning and heat treatment. In this system PVAc was used as the precursor nanofiber binder component along with the nanoparticles and PEO 100k was used as the supporting polymer component. Table 1 shows melt flow index (MFI) values for these polymers which are both above 5 g/10 min, the minimum MFI required for bicomponent melt spinning.

TABLE 1

| Melt flow index measurements of amorphous and semicrystalline polymers. Melt Flow Index (g/10 min) at 210° C. | |
|---|---|
| HDPE 25055 | 33 |
| Polypropylene | 24 |
| Dowlex PE | 39 |
| PLA | 32 |
| PEO 100k | 13 |
| PVAc | 26 |
| 20% ITO in PVAc | 29 |

After heat treatment the fibers needed to be in contact with removal solvent to remove the supporting polymer. It may be necessary to be wash to remove the supporting polymer component prior to heat treatment. A viable binder component could be polyvinyl butyral (PVB) which is water insoluble yet easy to dissolve in organic solvents. PVAc solubility is similar to PEO, making washing more difficult as PEO swells in water.

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the breadth of the range.

This invention can be embodied in other forms without departing from the spirit or essential attributes thereof, and accordingly, reference should be had to the following claims to determine the scope of the invention.

We claim:

1. A method of making indium tin oxide nanofibers, comprising the steps of:
   mixing indium and tin precursor compounds with a binder polymer to form a nanofiber precursor composition;
   co-forming the nanofiber precursor composition with a supporting polymer to form a composite nanofiber comprising a precursor composition nanofiber completely surrounded by the supporting polymer composition;
   removing the supporting polymer composition from the composite nanofiber to expose the precursor composition nanofiber;
   heating the precursor composition nanofiber in the presence of oxygen to form indium tin oxide and to remove the binder polymer to form an indium tin oxide nanofiber.

2. The method of claim 1, wherein the precursor composition nanofiber is between 100 nm and 20 μm in width.

3. The method of claim 1, wherein the composite nanofiber is greater than 10 μm in width.

4. The method of claim 1, wherein the indium tin oxide nanofiber is less than 100 μm.

5. The method of claim 1, further comprising the step of stretching the nanofiber precursor to produce indium tin oxide nanofiber to a width of less than 1 μm.

6. The method of claim 1, wherein the indium precursor compound is at least one selected from the group consisting of Indium acetate ($In(CH_3COO)_3$, Indium trihalide [e.g., Indium trichloride ($InCl_3$), Indium tribromide ($InBr_3$)] Indium nitrate ($In(NO_3)_3$), Indium sulfate ($In_2(SO_4)_3$), and Indium hydroxide ($In(OH)_3$).

7. The method of claim 1, wherein the tin precursor compound is at least one selected from the group consisting of Tin(II) 2-ethylhexanoate ($[CH_3(CH_2)_3CH(C_2H_5)CO_2]$ 2Sn), Tin Chloride ($SnCl_2.2H_2O$), Tin Bromide ($SnBr_2$), Tin Pyrophsophate $Sn_2P_2O_7$, and Tin Nitrate $Sn(NO_3)_4$.

8. The method of claim 1 wherein the binder polymer comprises at least one selected from the group consisting of polyethylene, polyethelene oxide polyvinyl acetate, poly lactic acid, polyester, polypropylene, and ethylene-propylene copolymers.

9. The method of claim 1, wherein the supporting polymer comprises at least one selected from the group consisting of polylactic acid, polyethelene, polyesters, polystyrene, and polyurethane.

10. The method of claim 1, wherein the step of removing the supporting polymer composition comprises heating.

11. The method of claim 10, wherein the heating to remove the supporting polymer composition is to a temperature sufficient to melt, pyrolize, or combust the supporting polymer composition, but not the binder polymer.

12. The method of claim 1, wherein the step of removing the supporting polymer composition comprises the step of contacting the supporting polymer with a removal composition.

13. The method of claim 12, wherein the removal composition comprises at least one selected from the group consisting of a solvent for the supporting polymer, and a composition reactive with the supporting polymer and unreactive with the binder polymer.

14. The method of claim 1, wherein the step of heating the precursor nanofiber to form indium tin oxide comprises heating the precursor composition nanofiber to between 300° C. and 1000° C.

15. The method of claim 14 wherein the step of heating the precursor composition nanofiber to form indium tin oxide comprises increasing the temperature of the precursor composition nanofiber at a ramp rate of between 1° C./min. and 20° C./min.

16. The method of claim 1, wherein the co-forming step is melt spinning.

17. The method of claim 1, further comprising the step of forming a plurality of the indium tin oxide nanofibers into a web.

18. The method of claim 1, wherein the mixing step comprises at least one selected from the group consisting of melt mixing and solution mixing.

19. The method of claim 1, wherein the co-forming step comprises multicomponent spinning.

20. The method of claim 19, wherein the multicomponent spinning comprises at least one selected from the group consisting of melt spinning, gel spinning, and solution spinning.

21. The method of claim 1, further comprising the step of, after the formation of indium tin oxide, treating the indium tin oxide nanofiber to render the indium tin oxide nanofiber more electrically conductive.

22. The method of claim 21, wherein the treating is with heat and $H_2$.

23. The method of claim 1, wherein the co-forming step comprises forming the precursor composition nanofiber into a desired shape.

* * * * *